US012617051B2

(12) United States Patent
Hikita et al.

(10) Patent No.: US 12,617,051 B2
(45) Date of Patent: May 5, 2026

(54) MAGAZINE AND MACHINE TOOL

(71) Applicant: DMG MORI CO., LTD., Nara (JP)

(72) Inventors: Isao Hikita, Nara (JP); Kenichi Mizukoshi, Nara (JP); Nobuhiko Hiraiwa, Nara (JP)

(73) Assignee: DMG MORI CO., LTD., Nara (JP)

( * ) Notice: Subject to any disclaimer, the term of this patent is extended or adjusted under 35 U.S.C. 154(b) by 606 days.

(21) Appl. No.: 18/016,561

(22) PCT Filed: Feb. 4, 2021

(86) PCT No.: PCT/JP2021/004036
§ 371 (c)(1),
(2) Date: Jan. 17, 2023

(87) PCT Pub. No.: WO2022/018893
PCT Pub. Date: Jan. 27, 2022

(65) Prior Publication Data
US 2024/0207989 A1 Jun. 27, 2024

(30) Foreign Application Priority Data

Jul. 20, 2020 (JP) ................................. 2020-123817

(51) Int. Cl.
*B23Q 3/155* (2006.01)
*B23Q 3/157* (2006.01)
(52) U.S. Cl.
CPC ..... *B23Q 3/15546* (2013.01); *B23Q 3/15722* (2016.11); *B23Q 2003/15532* (2016.11); *Y10T 483/134* (2015.01); *Y10T 483/1882* (2015.01)

(58) Field of Classification Search
CPC ............ B23Q 3/15546; B23Q 3/15722; B23Q 2003/15532; Y10T 483/132;
(Continued)

(56) References Cited

U.S. PATENT DOCUMENTS 3,187,123 A * 6/1965 Anthony ............ B23Q 3/15546
483/8
3,744,648 A * 7/1973 Kuhnert ................. G05B 19/23
483/68
(Continued)

FOREIGN PATENT DOCUMENTS

JP S62120934 A * 6/1987
JP S62228342 A * 10/1987
(Continued)

*Primary Examiner* — Sunil K Singh
*Assistant Examiner* — Michael Vitale
(74) *Attorney, Agent, or Firm* — IP Business Solutions, LLC.

(57) ABSTRACT

A magazine includes: a first driving mechanism unit that rotates tool pots so as to position, at a first position, an identifier in a tool pot placed at a transportation position different from a magazine-side tool change position and so as to position, at a second position, an identifier in a tool pot placed at the magazine-side tool change position; and a second driving mechanism unit that moves a reading device so as to position the reading device at a third position when reading the identifier by the reading device and so as to position the reading device at a fourth position when transporting the tool pots.

8 Claims, 11 Drawing Sheets

(58) Field of Classification Search
CPC ........... Y10T 483/134; Y10T 483/1864; Y10T
483/1873; Y10T 483/1882
USPC ...................................... 483/8, 9, 65, 66, 67
See application file for complete search history.

(56) References Cited

U.S. PATENT DOCUMENTS

| | | | | |
|---|---|---|---|---|
| 4,856,177 A | * | 8/1989 | Takeuchi ........... | B23Q 3/15546 |
| | | | | 409/234 |
| 5,257,199 A | * | 10/1993 | Tsujino ............ | G05B 19/41825 |
| | | | | 235/375 |
| 6,428,454 B1 | * | 8/2002 | Yokota ............... | B23Q 3/15724 |
| | | | | 483/68 |
| 2016/0303697 A1 | * | 10/2016 | Isobe ................. | B23Q 3/15722 |

FOREIGN PATENT DOCUMENTS

| | | | | | |
|---|---|---|---|---|---|
| JP | S62264839 A | * | 11/1987 | ......... | B23Q 3/15546 |
| JP | S6458446 A | * | 3/1989 | ......... | B23Q 3/15546 |
| JP | H02172646 A | * | 7/1990 | ......... | B23Q 3/15546 |
| JP | H04304943 A | * | 10/1992 | ......... | B23Q 3/15546 |
| JP | H05-154732 A | | 6/1993 | | |
| JP | H0549232 U | * | 6/1993 | | |
| JP | H06000632 U | | 1/1994 | | |
| JP | H07007829 U | | 2/1995 | | |
| JP | 2004142043 A | | 5/2004 | | |
| JP | 2020-104194 A | | 7/2020 | | |

* cited by examiner

MAGAZINE AND MACHINE TOOL

TECHNICAL FIELD

The present invention relates to a magazine and a machine tool.

BACKGROUND ART

For example, Japanese Patent Laying-Open No. 2004-142043 (PTL 1) discloses a composite machining lathe including: a cutting tool rest; a first tool magazine and a second tool magazine; a tool changer that changes a tool held by the first tool magazine with a tool attached on the cutting tool rest; and a tool transporting device that transport tools between the first tool magazine and the second tool magazine.

CITATION LIST

Patent Literature

PTL 1: Japanese Patent Laying-Open No. 2004-142043

SUMMARY OF INVENTION

Technical Problem

As disclosed in PTL 1 above, there has been known a machine tool including a magazine that stores a plurality of tools. In such a machine tool, each of the tools is provided with an identifier, such as an IC chip, that stores various types of tool information such as a type, length or diameter of the tool or a history of processing workpieces using the tool, and the tool information is read from the identifier by a reading device in the magazine for the sake of processing of workpieces, management of tools, or the like.

Since the tools are arranged close to each other in the magazine, however, it may be difficult to read the identifier by the reading device depending on the position of the identifier provided on the tool. Further, when installing the reading device, it is necessary to avoid interference between the reading device and a tool holding unit that holds a tool in the magazine.

Thus, it is an object of the present invention to solve the above-described problem and provide: a magazine in which an identifier accompanied with a tool can be read by a reading device and the reading device can be prevented from interfering with a tool holding unit; and a machine tool including such a magazine.

Solution to Problem

A magazine according to the present invention includes: a transporting device that has a plurality of tool holding units and that transports the plurality of tool holding units, each of the plurality of tool holding units detachably holding a tool inserted along a predetermined axis; a reading device that reads an identifier accompanied with a tool in a tool holding unit transported to a predetermined transportation position; a first driving mechanism unit that rotates each of the tool holding units about the predetermined axis so as to position, at a first position, an identifier in a tool holding unit placed at a transportation position different from the predetermined transportation position, and so as to position, at a second position, the identifier in the tool holding unit placed at the predetermined transportation position, the second position being displaced from the first position in a circumferential direction of the predetermined axis; and a second driving mechanism unit that moves the reading device so as to position the reading device at a third position when reading the identifier by the reading device and so as to position the reading device at a fourth position when transporting the plurality of tool holding units by the transporting device, the third position being a position facing the identifier positioned at the second position, the fourth position being a position away from the tool holding units with respect to the third position.

According to the magazine thus configured, in the tool holding unit placed at the predetermined transportation position, the identifier is positioned at the second position displaced from the first position in the circumferential direction of the predetermined axis, and the reading device is positioned at the third position facing the identifier positioned at the second position, with the result that the identifier can be read by the reading device. Further, when transporting the plurality of tool holding units by the transporting device, the reading device is positioned at the fourth position away from the tool holding units with respect to the third position, with the result that the reading device can be prevented from interfering with the tool holding units.

Preferably, the first driving mechanism unit has: an elastic member that applies, to each of the tool holding units, elastic force in a direction in which the identifier is moved from the second position to the first position; and a cylinder that is provided to be able to advance to and retreat from the tool holding unit placed at the predetermined transportation position and that applies, to the tool holding unit, external force in the direction in which the identifier is moved from the first position to the second position.

According to the magazine thus configured, the tool holding unit can be rotated by the cylinder so as to move the identifier from the first position to the second position, and the tool holding unit can be rotated by the elastic member so as to move the identifier from the second position to the first position.

Preferably, the second driving mechanism unit has a cylinder that moves the reading device between the third position and the fourth position.

According to the magazine thus configured, the reading device can be moved between the third position and the fourth position by the cylinder.

Preferably, the first driving mechanism unit and the second driving mechanism unit share a cylinder that is provided to be able to advance to and retreat from the tool holding unit placed at the predetermined transportation position, that applies, to the tool holding unit, external force in a direction in which the identifier is moved from the first position to the second position, and that moves the reading device between the third position and the fourth position.

According to the magazine thus configured, since the cylinder is shared by the first driving mechanism and the second driving mechanism, the magazine can have a simple configuration.

Preferably, the plurality of tool holding units are arranged in the circumferential direction. The identifier positioned at the first position is placed to orient in a direction tangential to the direction in which the plurality of tool holding units are arranged. The identifier positioned at the second position is placed to orient toward an outer circumferential side with respect to the direction tangential to the direction in which the plurality of tool holding units are arranged.

According to the magazine thus configured, since the identifier positioned at the first position is placed to orient in the direction tangential to the direction in which the plurality of tool holding units are arranged, each of the tools can be stored in the magazine in the orientation conforming to the specification of the tool with which the identifier is accompanied in the circumferential direction of the predetermined axis. Further, since the identifier positioned at the second position is placed to orient toward the outer circumferential side with respect to the direction tangential to the direction in which the plurality of tool holding units are arranged, the reading device can be placed on the outer circumferential side with respect to the plurality of tool holding units, on which the reading device is less likely to interfere with the tool holding units.

A machine tool according to the present invention includes: the magazine according to any one of the descriptions above; and an automatic tool changer that brings tools into and out of the magazine. The predetermined transportation position corresponds to a tool change position at which the tools are changed between the magazine and the automatic tool changer.

According to the machine tool thus configured, the identifiers on the tools brought into and out of the magazine by the automatic tool changer can be read.

Preferably, when changing the tools between the magazine and the automatic tool changer, the identifier is positioned at the first position.

According to the machine tool thus configured, when changing the tools between the magazine and the automatic tool changer, the orientations of the tools in the circumferential direction of the predetermined axis can be the same between the magazine and the automatic tool changer.

Preferably, when changing the tools between the magazine and the automatic tool changer, the reading device is positioned at the fourth position.

According to the machine tool thus configured, the reading device can be prevented from interfering with the automatic tool changer when changing the tools between the magazine and the automatic tool changer.

Advantageous Effects of Invention

As described above, according to the present invention, there can be provided: a magazine in which an identifier accompanied with a tool can be read by a reading device and the reading device can be prevented from interfering with a tool holding unit; and a machine tool including such a magazine.

DESCRIPTION OF EMBODIMENTS

Figure 1:
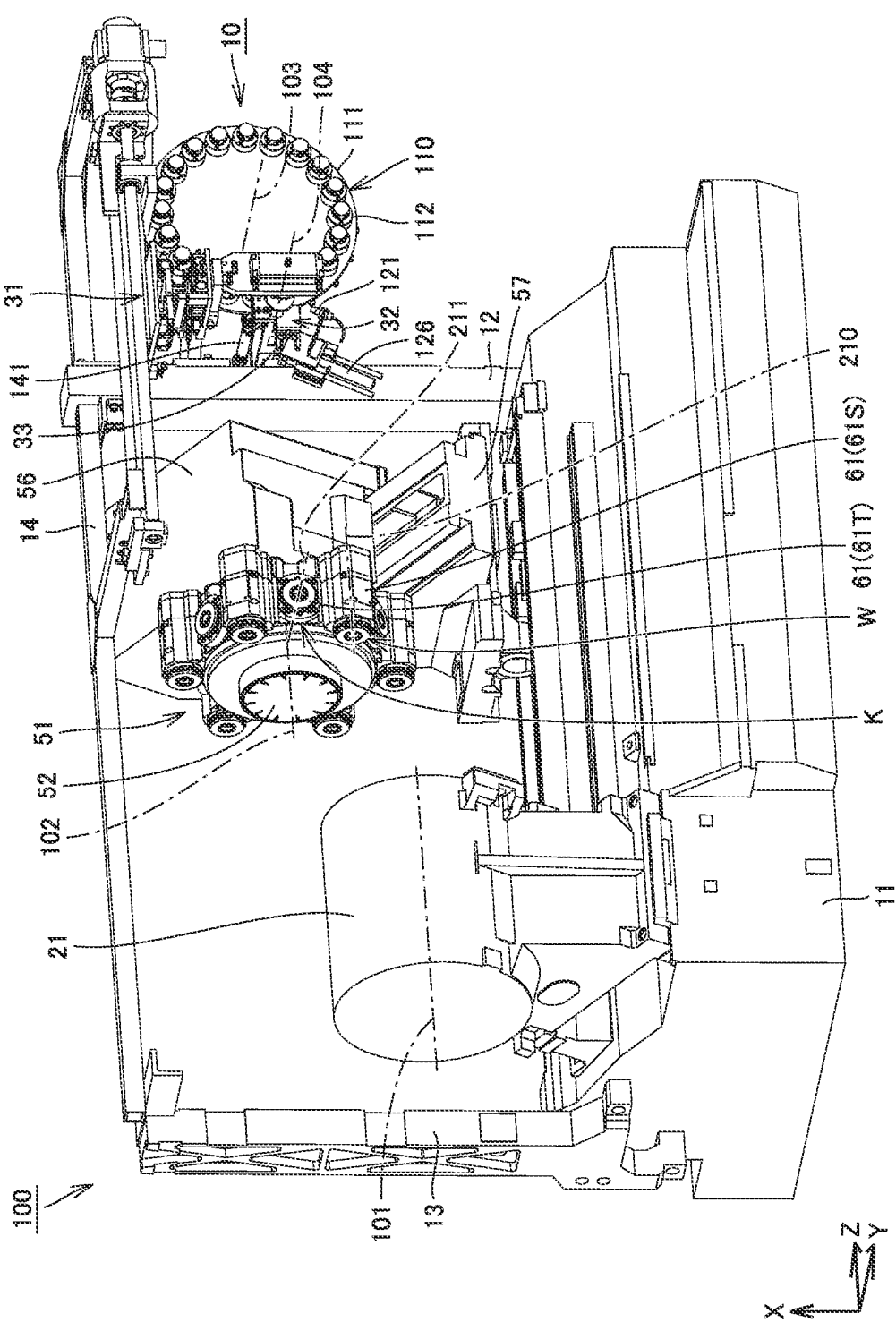
FIG. 1 is a perspective view showing a machine tool including a magazine according to an embodiment of the present invention.

Embodiments of the present invention will be described with reference to figures. It should be noted that in the figures referred to below, the same or corresponding members are denoted by the same reference characters.

Figure 2:
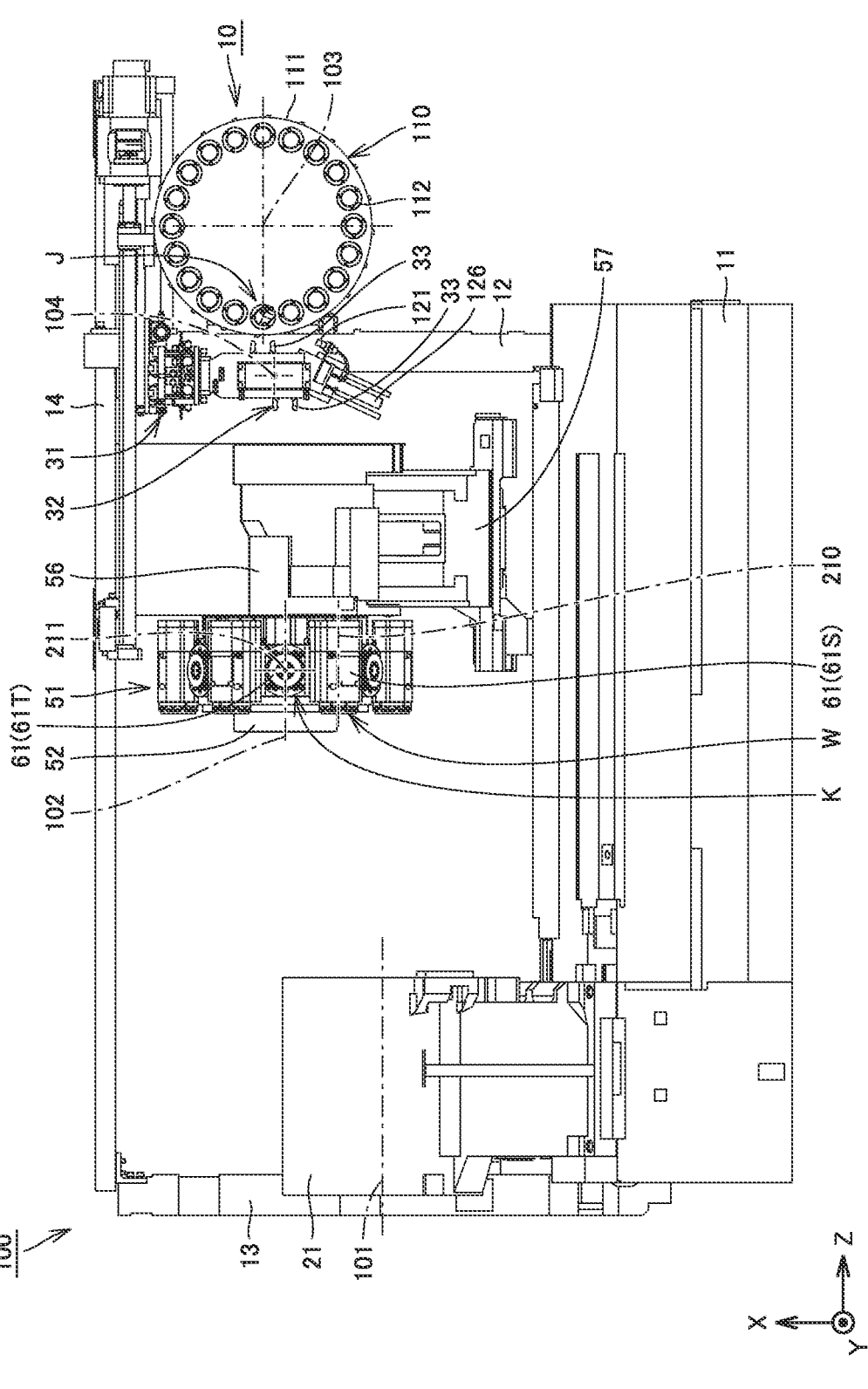
FIG. 2 is a front view showing the machine tool in FIG. 1.

FIG. 1 is a perspective view showing a machine tool including a magazine according to an embodiment of the present invention. FIG. 2 is a front view showing the machine tool in FIG. 1. In the figures, an internal structure of the machine tool is shown by seeing through a cover body that forms an external appearance of the machine tool.

Referring to FIGS. 1 and 2, a machine tool 100 is a lathe that processes a workpiece that is being rotated by bringing a tool into contact with the workpiece. Machine tool 100 has a milling function to process a workpiece that is stationary by bringing a tool that is being rotated into contact with the workpiece.

Machine tool 100 is an NC (Numerically Control) machine tool in which various operations for processing workpieces are automated through numerical control by a computer.

In the present specification, a "Z axis" represents an axis that is parallel to the leftward/rightward direction (width direction) of machine tool 100 and that extends in the horizontal direction, a "Y axis" represents an axis that is parallel to the frontward/rearward direction (depth direction) of machine tool 100 and that extends in the horizontal direction, and an "X axis" represents an axis that extends in the vertical direction. In FIG. 1, the rightward direction is referred to as a "+Z axis direction" and the leftward direction is referred to as a "−Z axis direction". In FIG. 1, the forward direction in the plane of sheet is referred to as a "+Y axis direction" and the backward direction in the plane of sheet is referred to as "−Y axis direction". The +Y axis direction corresponds to the front of the machine. In FIG. 1, the upward direction is referred to as a "+X axis direction", and the downward direction is referred to as a "−X axis direction".

It should be noted that for convenience of description of a structure of machine tool 100, the X axis, the Y axis, and the Z axis are set as described above, but they do not necessarily coincide with the X axis, the Y axis, and the Z axis defined in the lathe.

First, an overall structure of machine tool 100 will be described. Machine tool 100 has a bed 11, a headstock 21, a cutting tool rest 51, a magazine 10, and an automatic tool changer (ATC) 31.

Bed 11 is a base member that supports headstock 21, cutting tool rest 51, magazine 10, automatic tool changer 31, and the like, and is installed on a floor surface of a factory or the like. Bed 11 is composed of a metal such as cast iron.

Headstock 21 is attached to bed 11. Headstock 21 has a work spindle (not shown). The work spindle is driven to rotate about a rotation center axis 101 parallel to the Z axis. A chuck that detachably grasps a workpiece is provided at the tip of the work spindle. The workpiece grasped by the chuck is rotated about rotation center axis 101 according to the rotation of the work spindle.

Cutting tool rest 51 is provided in a processing area. The processing area is a space in which a workpiece is to be processed, and is substantially sealed by a cover body so as to avoid a foreign matter, such as chip or coolant involved in the processing of the workpiece, from being leaked to the outside of the processing area. Cutting tool rest 51 is configured to hold a plurality of tools. Cutting tool rest 51 is a turret type cutting tool rest that can be pivoted about a pivot center axis 102 parallel to the Z axis.

Cutting tool rest 51 has a turret 52, a cutting tool rest base 56, and a plurality of tool holders 61. Cutting tool rest base 56 is attached to a cross slide (not shown).

Turret 52 is provided to protrude in the direction (−Z axis direction) from cutting tool rest base 56 toward headstock 21 in the Z axis direction. Turret 52 has a shape of disk in which the axis direction of pivot center axis 102 corresponds to the thickness direction. Turret 52 can be pivoted about pivot center axis 102.

The plurality of tool holders 61 are attached to turret 52. The plurality of tool holders 61 are connected to turret 52 using bolts or the like. The plurality of tool holders 61 are arranged side by side in the circumferential direction of pivot center axis 102. Each of tool holders 61 detachably holds a tool. Tool holder 61 includes: a clamping mechanism unit that clamps or unclamps the tool; and a rotation mechanism unit that rotates the tool.

When turret 52 is pivoted about pivot center axis 102, the tool held by tool holder 61 is moved in the circumferential direction of pivot center axis 102. When processing a workpiece held by the work spindle of headstock 21, tool holder 61 is positioned at a workpiece processing position W. When changing a tool with a tool of a below-described automatic tool changer 31, tool holder 61 is positioned at a cutting-tool-rest-side tool change position K.

The plurality of tool holders 61 include a first tool holder 61S and a second tool holder 61T. When changing tools between cutting tool rest 51 and automatic tool changer 31, a tool is inserted in first tool holder 61S in the axis direction (Z axis direction) of pivot center axis 102 of cutting tool rest 51. The tool is inserted in first tool holder 61S along a center axis 210 extending in the axis direction of pivot center axis 102 of cutting tool rest 51. Center axis 210 coincides with the rotation center axis of the rotary tool held by first tool holder 61S. When changing the tools between cutting tool rest 51 and automatic tool changer 31, a tool is inserted in second tool holder 61T in the radial direction (Y axis direction) of pivot center axis 102 of cutting tool rest 51 at cutting-tool-rest side tool change position K. The tool is inserted in second tool holder 61T along a center axis 211 extending in the radial direction of pivot center axis 102 of cutting tool rest 51 at cutting-tool-rest side tool change position K. Center axis 211 coincides with the rotation center axis of the rotary tool held by second tool holder 61T.

It should be noted that the placements of first tool holder 61S and second tool holder 61T shown in FIGS. 1 and 2 are exemplary and the placements are not particularly limited thereto. First tool holder 61S and second tool holder 61T may be arranged in a random order in the circumferential direction of pivot center axis 102.

Cutting tool rest 51 is supported by bed 11 through a saddle 57 and the cross slide (not shown). Saddle 57 is movable in the Z axis direction by various types of feeding mechanisms, guide mechanisms, servo motors, and the like. The cross slide is movable in an axis direction (referred to as "Xa axis direction") orthogonal to the Z axis and inclined with respect to the X axis and the Y axis by various types of feed mechanisms, guide mechanisms, servo motors, and the like. By moving saddle 57 and the cross slide in the Z axis direction and the Xa axis direction respectively, a position of the workpiece processed by the tool held by tool holder 61 can be moved in a Z-Xa axes plane.

Magazine 10 is provided outside the processing area. Magazine 10 is provided at a position separated from cutting tool rest 51 in the +Z axis direction. Cutting tool rest 51 is placed between headstock 21 and magazine 10 in the Z axis direction. Magazine 10 is attached to a pillar member 12 extending from bed 11 in the +X axis direction (upward). It should be noted that the layout of magazine 10 is not particularly limited, and magazine 10 may be placed, for example, on the rear side of the machine with respect to cutting tool rest 51.

Magazine 10 is a device that stores a plurality of tools in order to sequentially supply tools to the processing area in accordance with a purpose of processing. Magazine 10 stores rotary tools or stationary tools to be attached to tool holders 61 (61S, 61T) in cutting tool rest 51, examples of the rotary tools include drills, end mills, or milling cutters, and examples of the stationary tools include outer-diameter cutting tools, inner-diameter cutting tools, or grooving tools.

Magazine 10 has a transporting device 110 and an unclamping cylinder 141 (see FIG. 1 and FIG. 5 described later). Transporting device 110 has a plurality of tool pots 112 (tool holding units). Each of tool pots 112 detachably holds a tool. Tool pot 112 includes a clamping mechanism unit that clamps the tool. Unclamping cylinder 141 causes the clamping mechanism unit to perform an unclamping operation in tool pot 112 positioned at a magazine-side tool change position J.

Transporting device 110 is configured to transport the plurality of tool pots 112. Transporting device 110 further has a supporting plate 111 and a motor 113 (see FIG. 4 described later).

Supporting plate 111 has a shape of disk centered on a pivot center axis 103 parallel to the Y axis direction. Supporting plate 111 can be pivoted by motor 113 in a forward direction and a reverse direction around pivot center axis 103.

The plurality of tool pots 112 are supported by supporting plate 111 at certain intervals along an endless transport path. The plurality of tool pots 112 are arranged side by side at certain intervals along a circumferential path around pivot center axis 103. The plurality of tool pots 112 are arranged side by side at certain intervals along an outer circumferential edge of supporting plate 111.

When supporting plate 111 is pivoted about pivot center axis 103, tool pot 112 is transported in the circumferential direction of pivot center axis 103. When changing a tool with a tool of below-described automatic tool changer 31, tool pot 112 is placed at magazine-side tool change position J. When changing the tools between magazine 10 and automatic tool changer 31, a tool is inserted in tool pot 112 in the radial direction (Y axis direction) of pivot center axis 102 of cutting tool rest 51 at cutting-tool-rest side tool change position K.

It should be noted that when magazine 10 is laid out such that pivot center axis 103 of supporting plate 111 is parallel to the Z axis direction, the direction of insertion of the tool into tool pot 112 may be the axis direction (Z axis direction) of pivot center axis 102 of cutting tool rest 51.

Automatic tool changer 31 transports a tool between cutting tool rest 51 located in the processing area and magazine 10 located outside processing area. Automatic tool changer 31 changes the tool with a tool of tool holder 61 positioned at cutting-tool-rest-side tool change position K in cutting tool rest 51. Automatic tool changer 31 changes the tool with the tool of tool pot 112 positioned at the magazine-side tool change position J in the magazine 10.

Automatic tool changer 31 is supported by a supporting frame 14. Supporting frame 14 is connected to the upper end portions of pillar members 12 and 13. Pillar members 12 and 13 extend from bed 11 in the +X axis direction (upward) and are placed to be separated from each other in the Z axis direction. Automatic tool changer 31 is movable in the Z axis direction by various types of feeding mechanisms, guiding mechanisms, servo motors, and the like provided on supporting frame 14 and the like.

Automatic tool changer 31 has an arm unit 32. Arm unit 32 can be pivoted about a pivot center axis 104 and is slidable in the axis direction of pivot center axis 104. Arm unit 32 includes a pair of grasping portions 33. The pair of grasping portions 33 are provided at phase positions displaced from each other by 180° with respect to pivot center axis 104. The pair of grasping portions 33 have shapes of claws by which a tool can be grasped. Grasping portions 33 are moved between magazine-side tool change position J and the cutting-tool-rest side tool change position K while grasping the tool.

Arm unit 32 is rotatable by an actuator (not shown) or the like between a first posture in which pivot center axis 104 is parallel to the Z axis direction and a second posture (posture shown in FIGS. 1 and 2) in which pivot center axis 104 is parallel to the Y axis direction.

When changing the tool with the tool of first tool holder 61S positioned at cutting-tool-rest-side tool change position K in cutting tool rest 51, arm unit 32 is brought into the first posture. When changing the tool with the tool of second tool holder 61T positioned at cutting-tool-rest-side tool change position K in cutting tool rest 51, arm unit 32 is brought into the second posture. When changing the tool with the tool of tool pot 112 positioned at magazine-side tool change position J in magazine 10, arm unit 32 is brought into the second posture. Arm unit 32 changes the tools by performing pivoting and sliding operations while grasping the tools by grasping portions 33 at each of cutting-tool-rest-side tool change position K and magazine-side tool change position J.

It should be noted that arm unit 32 is not limited to a double-arm type arm unit that can grasp two tools at the same time, and may be a single-arm type arm unit that can grasp one tool at the same time.

Figures 3, 4:
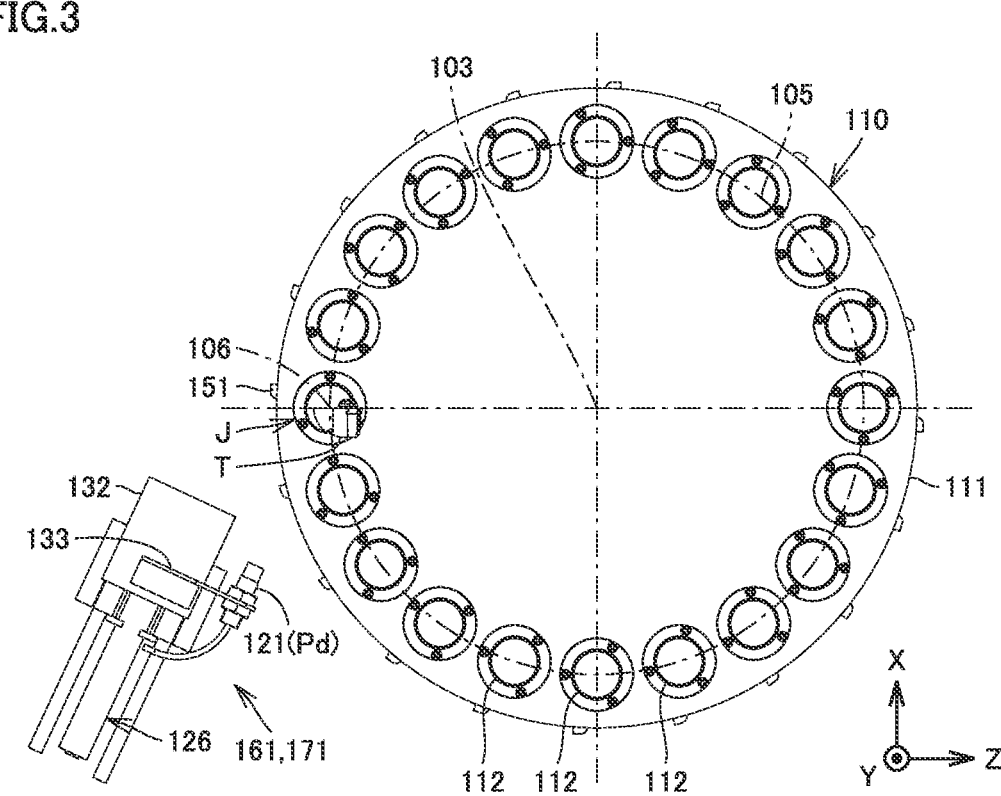
FIG. 3 is a front view showing the magazine when transporting tool pots.
FIG. 4 is a perspective view of the magazine in FIG. 3 when viewed from the rear side of the machine.
Figure 8:
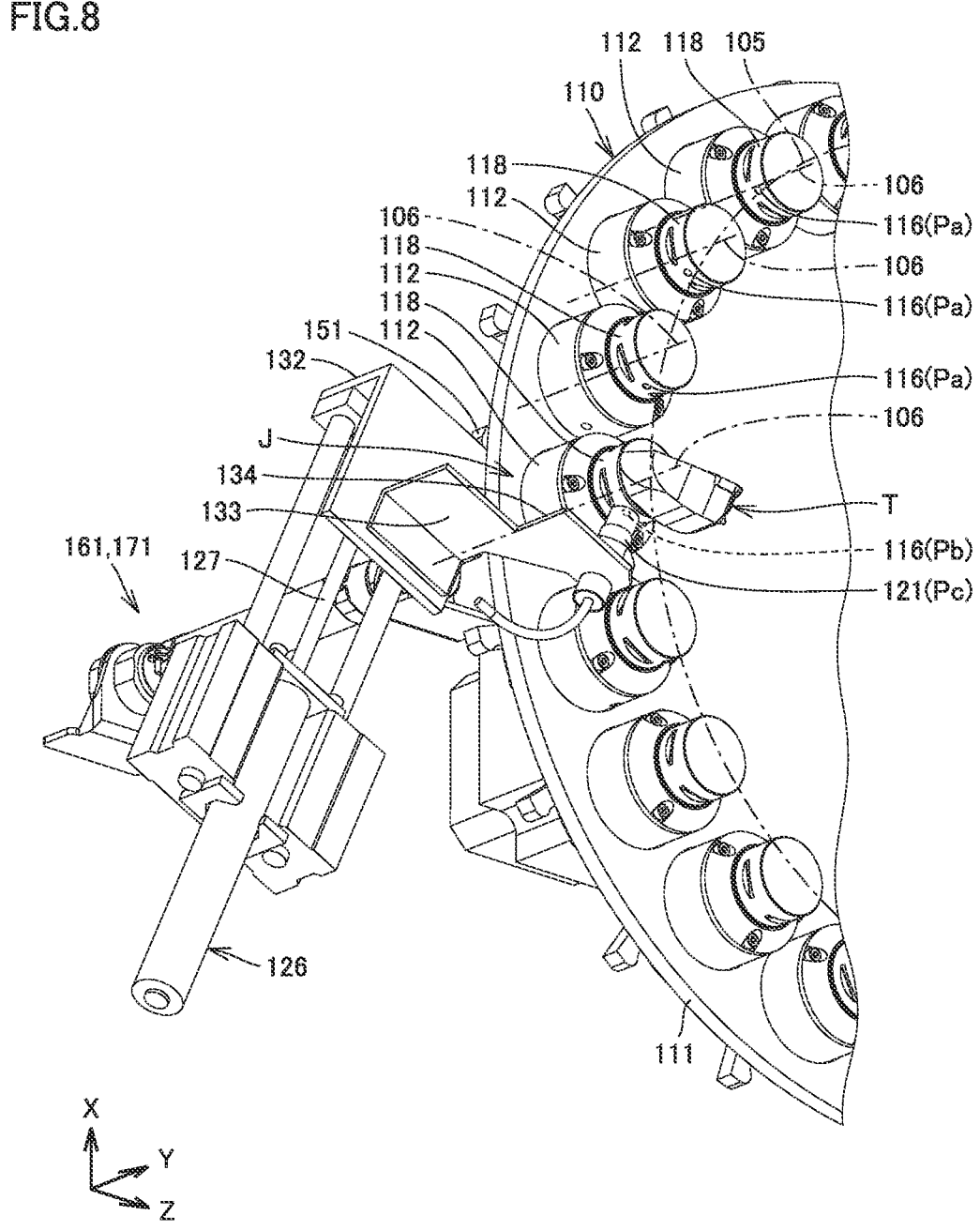
FIG. 8 is a perspective view of the magazine in FIG. 6 when viewed from the front side of the machine.

Next, a structure of magazine 10 will be described in detail. FIG. 3 is a front view showing the magazine when transporting the tool pots. FIG. 4 is a perspective view of the magazine in FIG. 3 when viewed from the rear side of the machine. FIG. 5 is a perspective view of the magazine in FIG. 3 when viewed from the front side of the machine. FIG. 6 is a front view showing the magazine when reading an identifier. FIG. 7 is a perspective view of the magazine in FIG. 6 when viewed from the rear side of the machine. FIG. 8 is a perspective view of the magazine in FIG. 6 when viewed from the front side of the machine.

It should be noted that in FIGS. 3, 5, 6 and 8, a tool T is attached to tool pot 112 positioned at magazine-side tool change position J. It should be also noted that only shank portions 118 (CAPTO shanks in the present embodiment) of the tools attached to tool pots 112 are shown at transportation positions different from magazine-side tool change position J.

Referring to FIGS. 3 to 8, the plurality of tool pots 112 are arranged side by side on a circumference 105 centered on pivot center axis 103. Magazine-side tool change position J is located at a position separated from pivot center axis 103 in the horizontal direction (−Z axis direction).

Each of tool pots 112 has a shape that can receive shank portion 118 of the tool. Tool pot 112 has a cylindrical shape centered on a center axis 106 parallel to the Y axis direction. The tool is inserted in tool pot 112 along center axis 106. When attaching the tool to tool pot 112 positioned at magazine-side tool change position J, arm unit 32 in FIGS. 1 and 2 performs a sliding operation along the axis direction of pivot center axis 104, thereby inserting the tool into tool pot 112 along center axis 106.

Center axis 106 coincides with the rotation center axis of the rotary tool held by tool pot 112. Center axis 106 is located on circumference 105.

Figure 5:
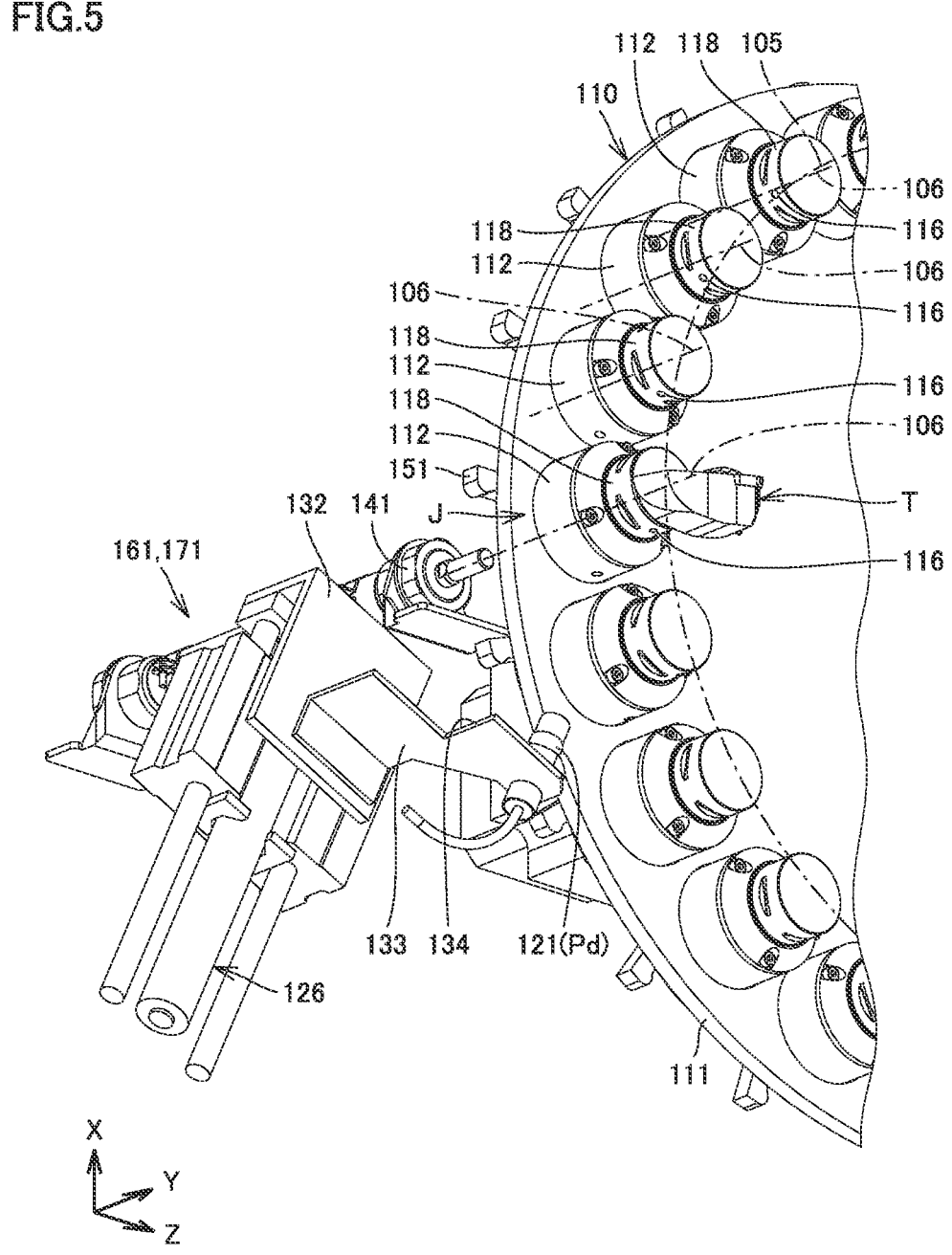
FIG. 5 is a perspective view of the magazine in FIG. 3 when viewed from the front side of the machine.
Figures 6, 7:
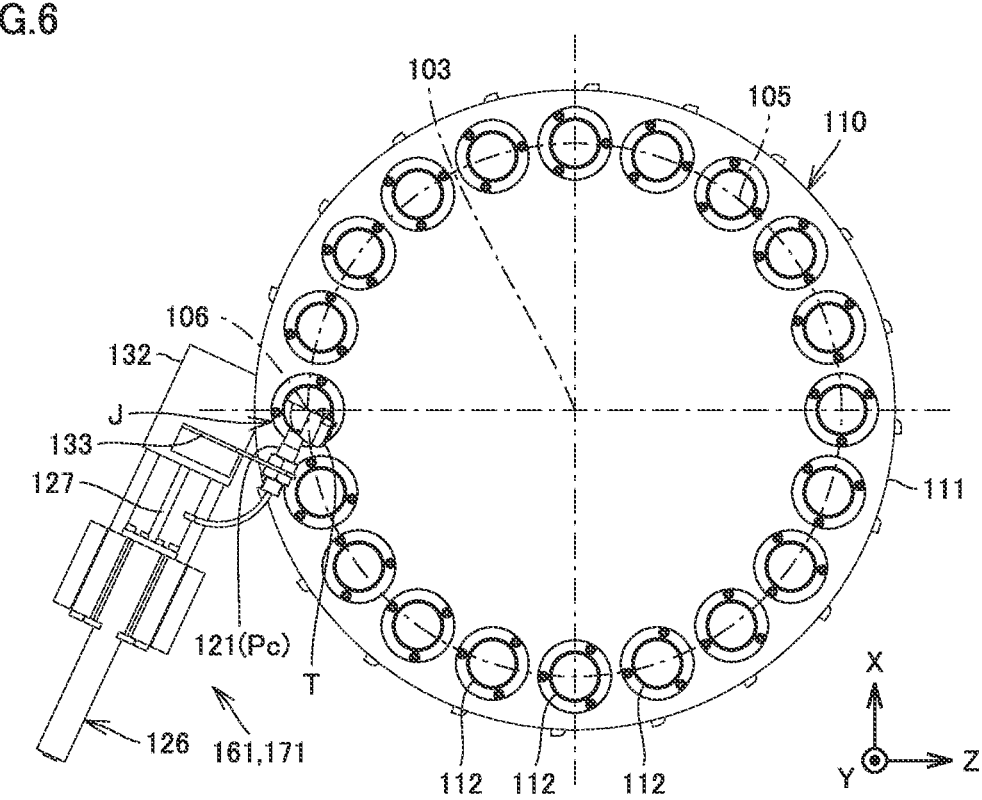
FIG. 6 is a front view showing the magazine when reading an identifier.
FIG. 7 is a perspective view of the magazine in FIG. 6 when viewed from the rear side of the machine.

As shown in FIG. 5, an identifier 116 is provided to be accompanied with the tool. Identifier 116 is provided at shank portion 118 of the tool.

Identifier 116 is constituted of an IC chip. Information about the tool to which identifier 116 is attached is included in identifier 116 in such a state that the information is readable. As an example, identifier 116 stores: a type, length, or diameter of the tool; or a history of processing workpieces using the tool. It should be noted that identifier 116 is not limited to the IC chip, and may be, for example, a bar code or a QR (Quick Response) code.

Magazine 10 further has a reading device 121. Reading device 121 can read identifier 116. Reading device 121 can read the information stored in identifier 116.

Reading device 121 is attached to pillar member 12 in FIGS. 1 and 2 via a cylinder 126 described later. Reading device 121 is placed below pivot center axis 103. Reading device 121 is provided below center axis 106 of tool pot 112 positioned at magazine-side tool change position J. Reading device 121 is placed on the outer side with respect to circumference 105 in a direction of radius centered on pivot center axis 103.

Figure 9:
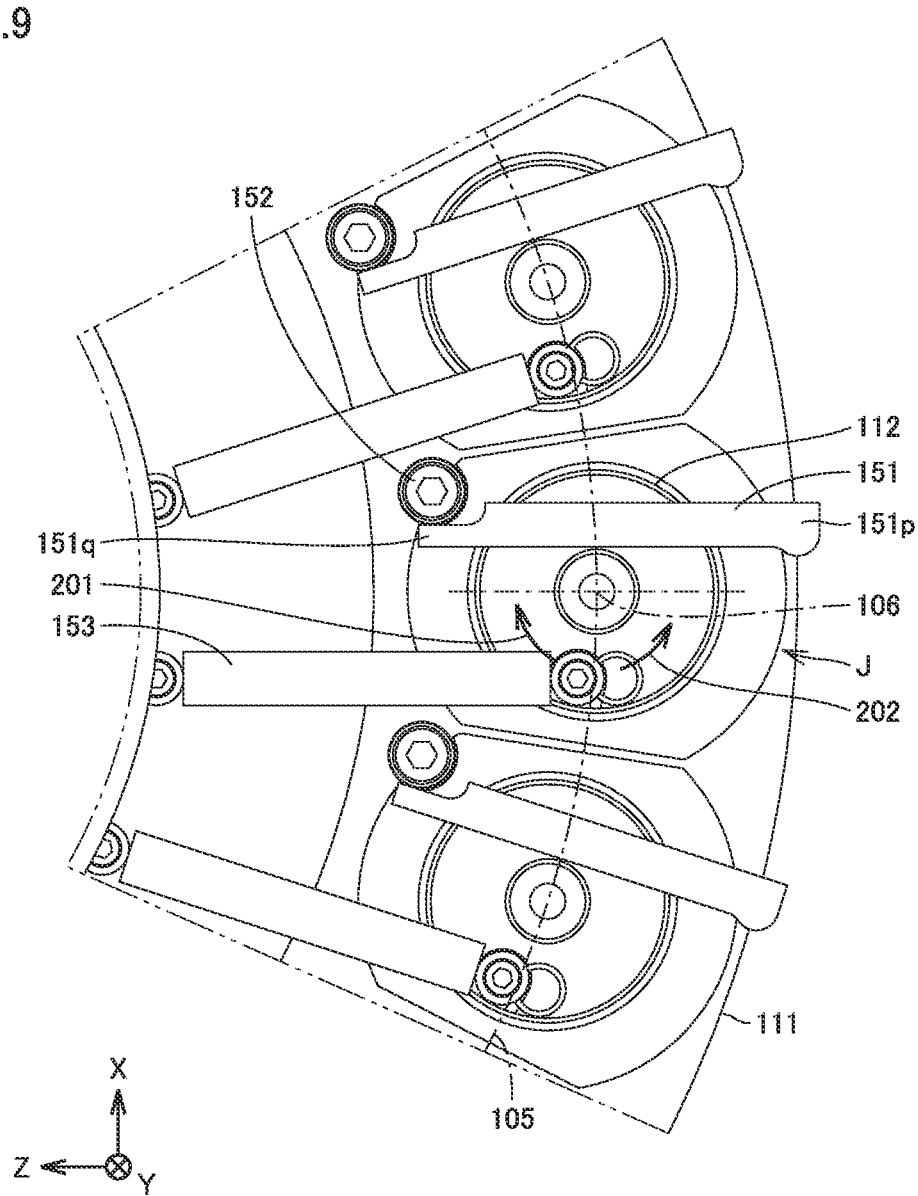
FIG. 9 is a rear view showing the magazine in a range surrounded by a chain double-dashed line IX in FIG. 4.
Figure 10:
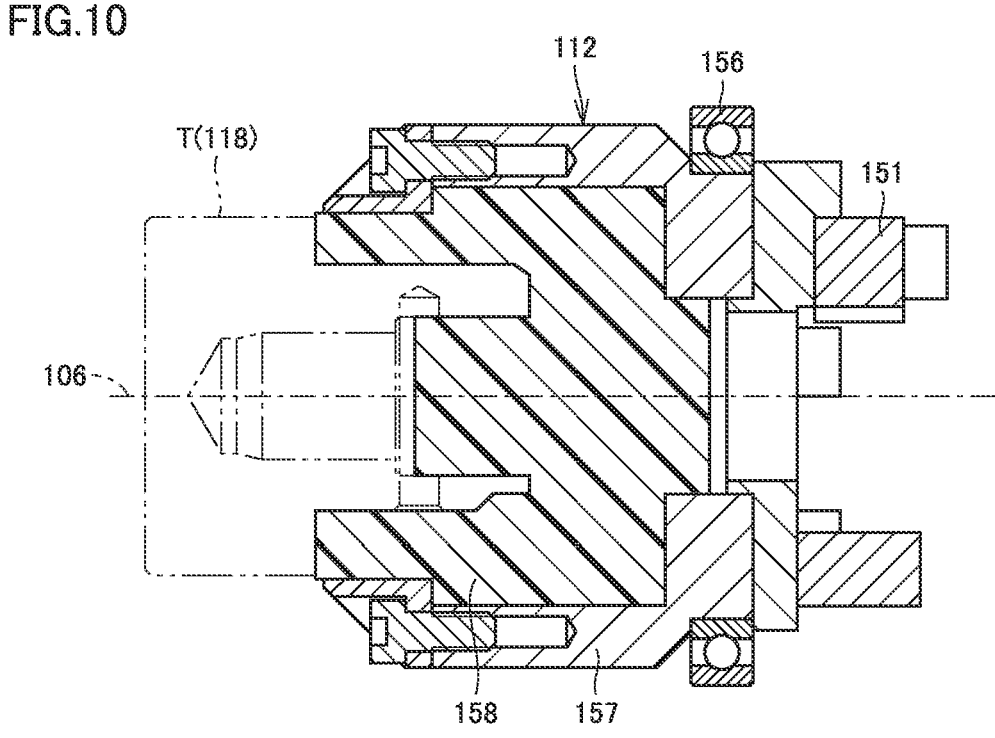
FIG. 10 is a cross sectional view showing a tool pot in FIG. 9.

FIG. 9 is a rear view showing the magazine in a range surrounded by a chain double-dashed line IX in FIG. 4. FIG. 10 is a cross sectional view showing the tool pot in FIG. 9. Referring to FIGS. 3 to 10, magazine 10 further has a first driving mechanism unit 161 and a second driving mechanism unit 171.

As shown in FIG. 8, first driving mechanism unit 161 rotates each of tool pots 112 about center axis 106 so as to position, at a first position Pa, each of identifiers 116 in tool pots 112 placed at transportation positions different from magazine-side tool change position J, and so as to position, at a second position Pb, identifier 116 in tool pot 112 placed at magazine-side tool change position J, second position Pb being displaced from first position Pa in the circumferential direction of center axis 106.

As shown in FIGS. 5 and 8, second driving mechanism unit 171 moves reading device 121 so as to position reading device 121 at a third position Pc when reading identifier 116 by reading device 121 and so as to position reading device 121 at a fourth position Pd when transporting the plurality of tool pots 112 by transporting device 110, third position Pc being a position facing identifier 116 positioned at second position Pb, fourth position Pd being a position away from tool pots 112 with respect to third position Pc.

As shown in FIG. 8, each of identifiers 116 positioned at first positions Pa is placed to orient in a direction tangential to the direction in which the plurality of tool pots 112 are arranged. Identifier 116 positioned at first position Pa is placed at a position overlapping with circumference 105 when magazine 10 is viewed in the axis direction of center axis 106 (pivot center axis 103). Identifier 116 positioned at first position Pa is placed at a phase position at which tool pots 112 adjacent to each other face each other in the circumferential direction of center axis 106.

Identifier 116 positioned at second position Pb is placed to orient toward the outer circumferential side with respect to the direction tangential to the direction in which the plurality of tool pots 112 are arranged. Identifier 116 positioned at second position Pb is placed on the outer side with respect to circumference 105 in the direction of radius centered on pivot center axis 103 when magazine 10 is viewed in the axis direction of center axis 106 (pivot center axis 103). Identifier 116 positioned at second position Pb is placed at a position displaced from the phase position at which tool pots 112 adjacent to each other face each other in the circumferential direction of center axis 106.

A rotation angle of each tool pot 112 about center axis 106 falls within a range of more than 0° and less than 90°. The rotation angle of tool pot 112 about center axis 106 more preferably falls within a range of more than 0° and less than 60°, and further preferably falls within a range of more than 0° and less than 30°.

As shown in FIGS. 6 and 8, reading device 121 positioned at third position Pc faces identifier 116 positioned at second position Pb in tool pot 112 positioned at magazine-side tool change position J. Reading device 121 positioned at third position Pc faces identifier 116 with a space being interposed therebetween in the radial direction of center axis 106.

As shown in FIGS. 3, 5, 6, and 8, the shortest distance between reading device 121 positioned at fourth position Pd and circumference 105 is more than the shortest distance between reading device 121 positioned at third position Pc and circumference 105. The shortest distance between reading device 121 positioned at fourth position Pd and pivot center axis 103 is more than the shortest distance between reading device 121 positioned at third position Pc and pivot center axis 103. The shortest distance between reading device 121 positioned at fourth position Pd and tool pot 112 positioned at magazine-side tool change position J is more than the shortest distance between reading device 121 positioned at third position Pc and tool pot 112 placed at magazine-side tool change position J.

Reading device 121 positioned at fourth position Pd is located below reading device 121 positioned at third position Pc.

Reading device 121 is moved between third position Pc and fourth position Pd in a plane (X-Z axes plane) orthogonal to center axis 106 (pivot center axis 103). Reading device 121 is moved straightly between third position Pc and fourth position Pd. Reading device 121 is moved straightly between third position Pc and fourth position Pd in a direction orthogonal to center axis 106 (pivot center axis 103).

The structures of first driving mechanism unit 161 and second driving mechanism unit 171 will be described more specifically. As shown in FIG. 10, each of tool pots 112 has a housing 157, a pot main body portion 158, and a bearing 156.

Housing 157 has a cylindrical shape centered on center axis 106. Pot main body portion 158 is provided on the inner circumferential side of housing 157. Pot main body portion

158 is composed of a resin. Pot main body portion 158 defines an opening through which shank portion 118 of tool T is inserted. Bearing 156 is interposed between housing 157 and supporting plate 111 in the radial direction of center axis 106. Housing 157 is supported by bearing 156 to be rotatable about center axis 106.

As shown in FIGS. 4, 7, 9, and 10, first driving mechanism unit 161 has elastic members 153, bars 151, bar-abutment portions 152, a cylinder 126, and a pressing plate 132.

Each of elastic members 153 apply, to tool pot 112, elastic force in a direction in which identifier 116 is moved from second position Pb to first position Pa.

Each of elastic members 153 is constituted of a coil spring. Elastic member 153 is placed opposite to identifier 116 provided to be accompanied with the tool with supporting plate 111 being interposed therebetween. Elastic member 153 is connected to supporting plate 111 and tool pot 112 (housing 157). Elastic member 153 applies, to tool pot 112, elastic force in the direction along the circumferential direction of center axis 106 (direction indicated by an arrow 201 in FIG. 9).

It should be noted that the elastic member in the present invention is not limited to the coil spring, and may be, for example, a gas spring.

Each of bars 151 has one end 151p and other end 151q. Bar 151 extends in one direction between one end 151p and other end 151q. Bar 151 is placed opposite to identifier 116 provided to be accompanied with the tool with supporting plate 111 being interposed therebetween. Bar 151 is connected to tool pot 112 (housing 157). Bar 151 is provided at a phase position opposite to elastic member 153 with center axis 106 being interposed therebetween.

Bar 151 is provided to extend over circumference 105 such that one end 151p is located on the outer circumferential side with respect to circumference 105 and other end 151q is located on the inner circumferential side with respect to circumference 105. One end 151p of bar 151 protrudes from tool pot 112 (housing 157) toward the outer side in the radial direction of pivot center axis 103. Other end 151q of bar 151 protrudes from tool pot 112 (housing 157) toward the inner side in the radial direction of pivot center axis 103.

Each of bar-abutment portions 152 is constituted of a bolt. Bar-abutment portion 152 is connected to supporting plate 111. Bar-abutment portion 152 is provided to face other end 151q of bar 151. A distance between bar-abutment portion 152 and other end 151q of bar 151 is increased or decreased according to the rotation operation of tool pot 112 about center axis 106. Tool pot 112, which receives the elastic force from elastic member 153, is facilitated to rotate in the direction indicated by arrow 201 in FIG. 9. On this occasion, other end 151q of bar 151 is brought into abutment with bar-abutment portion 152 to regulate the rotation of tool pot 112, with the result that identifier 116 is positioned at first position Pa.

A piston rod 127 of cylinder 126 is provided to be able to advance to and retreat from tool pot 112 placed at magazine-side tool change position J. Cylinder 126 applies, to tool pot 112, external force in the direction in which identifier 116 is moved from first position Pa to second position Pb.

Cylinder 126 is attached to pillar member 12 in FIGS. 1 and 2. Cylinder 126 is placed on the outer circumference of supporting plate 111. Pressing plate 132 is attached to the tip of piston rod 127 of cylinder 126.

Pressing plate 132 is moved closer to tool pot 112 placed at magazine-side tool change position J in response to cylinder 126 being driven to be lengthened. On this occasion, pressing plate 132 presses, in abutment with one end 151p of bar 151, tool pot 112 with respect to center axis 106 in a direction indicated by an arrow 202 in FIG. 9. Tool pot 112, which receives external force from cylinder 126, is rotated about center axis 106 in the direction indicated by arrow 202 in FIG. 9, with the result that identifier 116 is moved from first position Pa to second position Pb.

Pressing plate 132 retreats from tool pot 112 placed at magazine-side tool change position J in response to cylinder 126 being driven to be shortened. On this occasion, no external force from pressing plate 132 to tool pot 112 is applied. Tool pot 112, which receives elastic force from elastic member 153, is rotated about center axis 106 in the direction indicated by arrow 201 in FIG. 9, with the result that identifier 116 is moved from second position Pb to first position Pa.

As shown in FIGS. 3, 5, 6, and 8, second driving mechanism unit 171 has cylinder 126 and an attachment plate 133.

Cylinder 126 moves reading device 121 between third position Pc and fourth position Pd. Reading device 121 is attached to cylinder 126 (pressing plate 132) via attachment plate 133.

Reading device 121 is moved closer to tool pot 112 placed at magazine-side tool change position J in response to cylinder 126 being driven to be lengthened. Thus, reading device 121 is moved from fourth position Pd to third position Pc. Reading device 121 retreats from tool pot 112 placed at magazine-side tool change position J in response to cylinder 126 being driven to be shortened. Thus, reading device 121 is moved from third position Pc to fourth position Pd.

In the present embodiment, first driving mechanism unit 161 and second driving mechanism unit 171 share cylinder 126. It should be noted that the first driving mechanism unit and the second driving mechanism unit according to the present invention may have separate cylinders.

Figure 11:
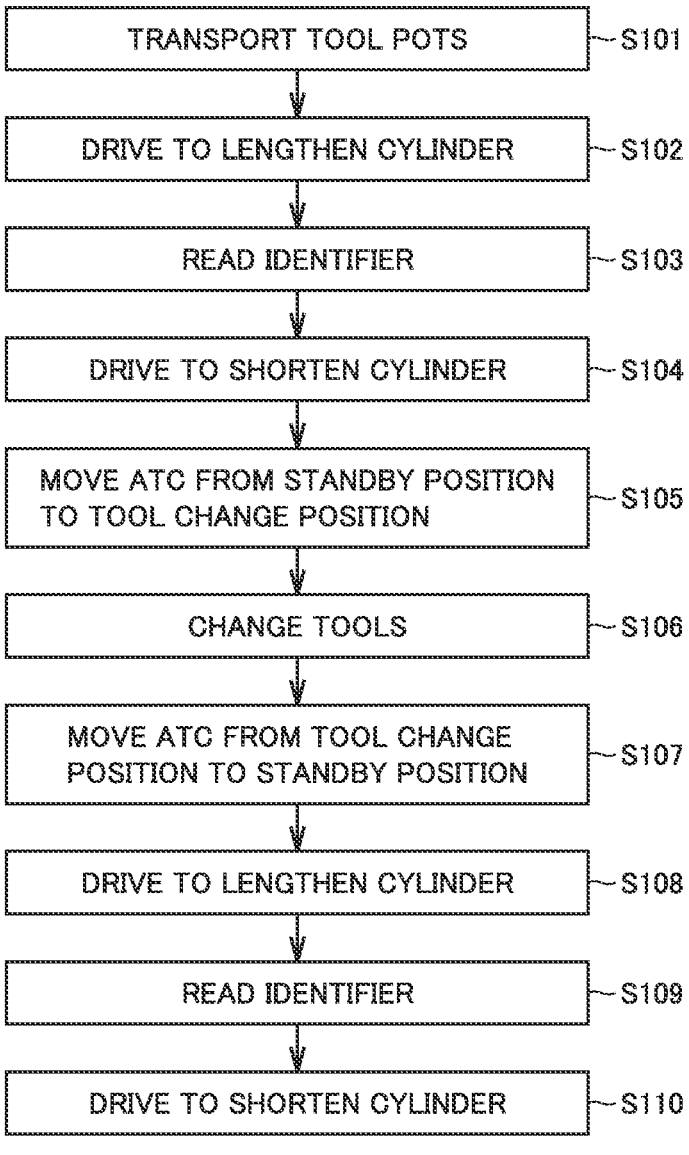
FIG. 11 is a flowchart showing a flow of changing tools between the magazine and an automatic tool changer.

Next, a flow of changing tools between magazine 10 and automatic tool changer 31 will be described. FIG. 11 is a flowchart showing the flow of changing the tools between the magazine and the automatic tool changer. Each of FIGS. 12 and 13 is a perspective view showing the magazine and the automatic tool changer when changing the tools between the magazine and the automatic tool changer.

Figure 12:
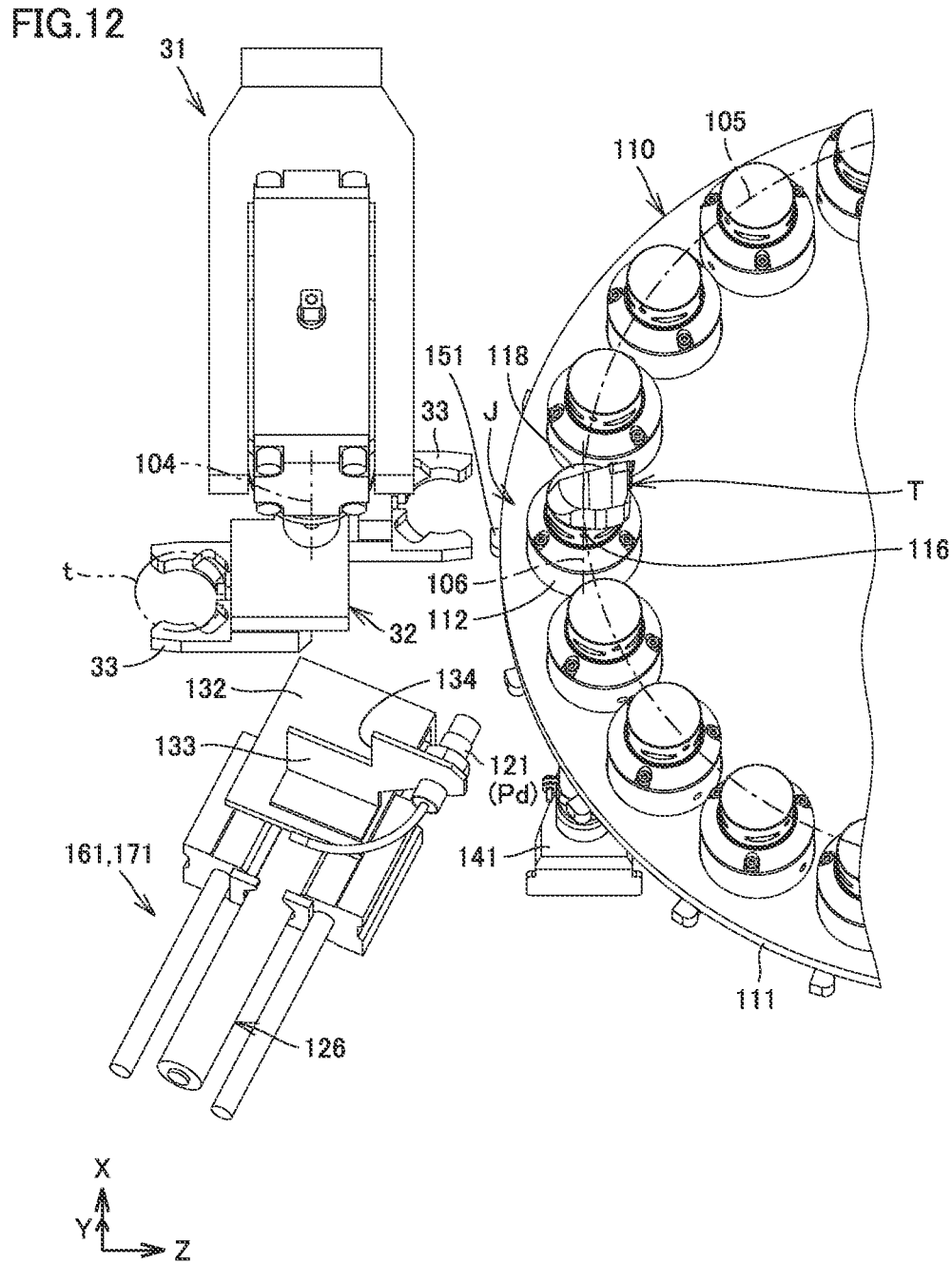
FIG. 12 is a perspective view showing the magazine and the automatic tool changer when changing the tools between the magazine and the automatic tool changer.

Referring to FIGS. 11 and 12, tool pots 112 are transported in magazine 10 (S101). By this step, a tool pot 112 in which a tool T necessary for subsequent processing of a workpiece is inserted is placed at magazine-side tool change position J.

When transporting tool pots 112, reading device 121 is positioned at fourth position Pd. Automatic tool changer 31 (arm unit 32) stands by at a position adjacent to magazine-side tool change position J in the Z axis direction. A tool tis grasped by one grasping portion 33 of arm unit 32.

Figure 13:
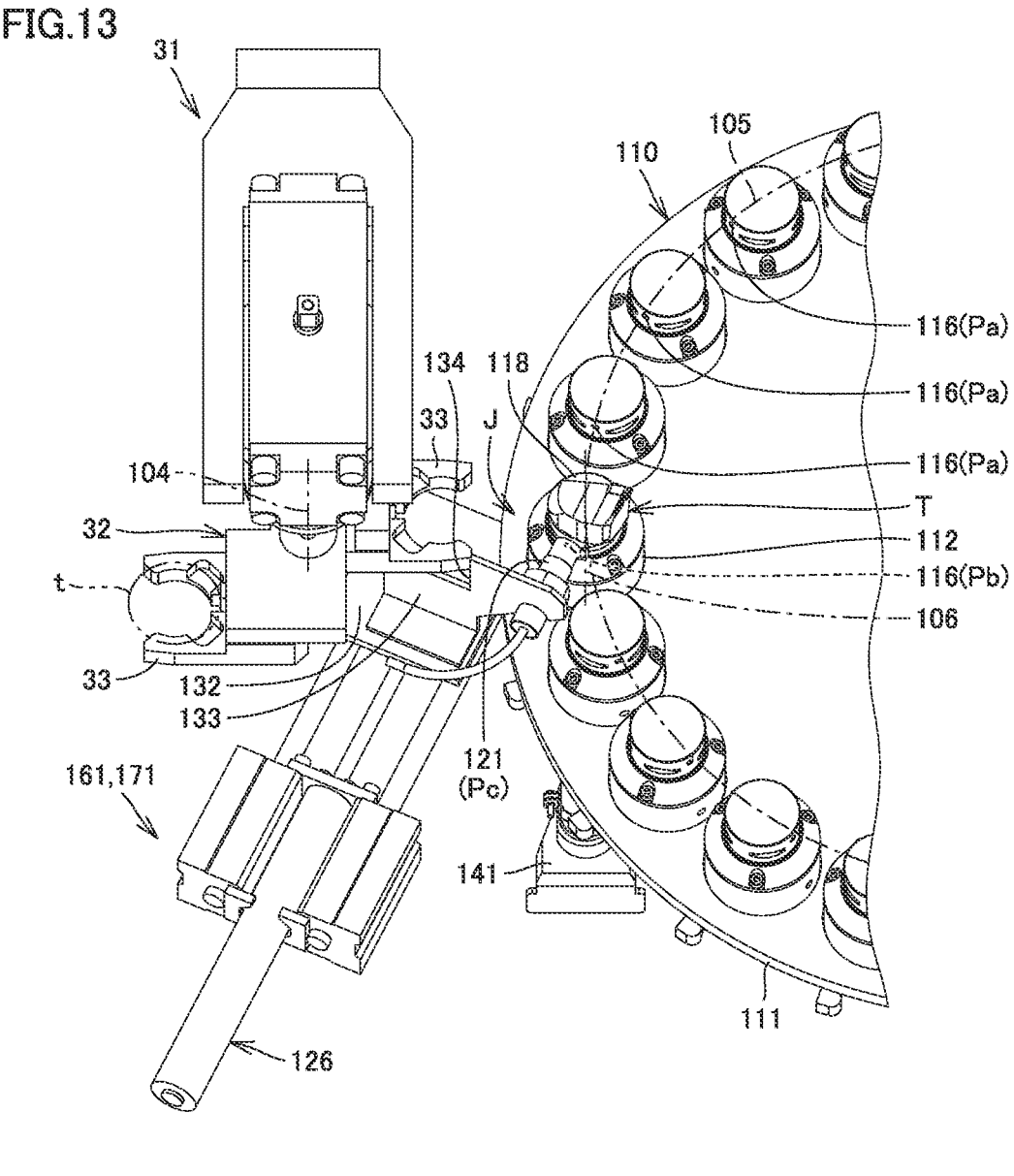
FIG. 13 is another perspective view showing the magazine and the automatic tool changer when changing the tools between the magazine and the automatic tool changer.

Referring to FIGS. 11 and 13, next, cylinder 126 is driven to be lengthened (S102). By this step, identifier 116 accompanied with tool T inserted in tool pot 112 is moved from first position Pa to second position Pb at magazine-side tool change position J. On this occasion, at each of the transportation positions different from magazine-side tool change position J, identifier 116 remains to be positioned at first position Pa. Further, reading device 121 is moved from fourth position Pd to third position Pc. Thus, reading device 121 is placed to face identifier 116. Next, identifier 116 is read by reading device 121 (S103).

Referring to FIGS. 11 and 12, next, cylinder 126 is driven to be shortened (S104). By this step, identifier 116 accompanied with tool T inserted in tool pot 112 is moved from second position Pb to first position Pa at magazine-side tool change position J. Further, reading device 121 is moved from third position Pc to fourth position Pd. Thus, reading device 121 retreats from tool pot 112.

Referring to FIG. 11, next, automatic tool changer 31 is moved from the standby position to cutting-tool-rest-side tool change position K (S105). By this step, tool T inserted in tool pot 112 is gripped by other grasping portion 33 of arm unit 32.

Next, tool T and tool t are changed with each other between magazine 10 and automatic tool changer 31 (S106). In this step, tool T held by other grasping portion 33 of arm unit 32 is pulled out from tool pot 112 through pivoting and sliding operations of arm unit 32, and tool t held by one grasping portion 33 of arm unit 32 is inserted into tool pot 112.

Next, automatic tool changer 31 is moved from cutting-tool-rest-side tool change position K to the standby position (S107). By this step, automatic tool changer 31 (arm unit 32) retreats from magazine 10.

Next, cylinder 126 is driven to be lengthened (S108). Next, identifier 116 is read by reading device 121 (S109). Next, cylinder 126 is driven to be shortened (S110). By these steps, identifier 116 accompanied with tool t newly inserted into tool pot 112 is read at magazine-side tool change position J in the same manner as described above.

By the above steps, the change of tools between magazine 10 and automatic tool changer 31 is completed.

In each of various types of tool holders such as CAPTO or HSK, a phase position at which identifier 116 is provided is determined by a specification. The orientation of identifier 116 placed at first position Pa in magazine-side tool change position J conforms to this specification.

In the present embodiment, in tool pot 112 placed at magazine-side tool change position J, identifier 116 is positioned at second position Pb displaced from first position Pa in the circumferential direction of center axis 106, and reading device 121 is positioned at third position Pc facing identifier 116 positioned at second position Pb, with the result that identifier 116 can be read by reading device 121. Further, since reading device 121 is positioned at fourth position Pd away from tool pots 112 with respect to third position Pc when transporting the plurality of tool pots 112 by transporting device 110, reading device 121 can be prevented from interfering with tool pots 112.

It should be noted that in order to enable reading device 121 to read identifier 116 placed at first position Pa, one may consider to incline the whole of magazine 10 so as to orient identifier 116 toward the outer circumferential side with respect to pivot center axis 103 at magazine-side tool change position J. In this case, however, the following concerns arise: the overall height of machine tool 100 including magazine 10 becomes high; and interference occurs between arm unit 32 of automatic tool changer 31 and magazine 10. Further, one may also consider to advance reading device 121 to identifier 116 placed at the phase position at which tool pots 112 adjacent to each other face each other. In this case, however, a pitch between tool pots 112 becomes large, with the result that magazine 10 becomes large.

In the present embodiment, first driving mechanism unit 161 and second driving mechanism unit 171 share cylinder 126. With such a configuration, the number of components of magazine 10 can be reduced, thereby reducing manufacturing cost.

Further, when changing the tools between magazine 10 and automatic tool changer 31 (S106), identifier 116 is positioned at first position Pa. With such a configuration, the orientations of the tools when changing the tools can be the same between magazine 10 and automatic tool changer 31.

Further, when changing the tools between magazine 10 and automatic tool changer 31 (S106), reading device 121 is positioned at fourth position Pd. With such a configuration, reading device 121 can be prevented from interfering with automatic tool changer 31 when changing the tools between magazine 10 and automatic tool changer 31.

As shown in FIG. 13, attachment plate 133 is provided with notch portion 134. When arm unit 32 of automatic tool changer 31 is positioned at the standby position and reading device 121 is positioned at third position Pc, grasping portion 33 of arm unit 32 is placed at notch portion 134.

With such a configuration, interference between magazine 10 and automatic tool changer 31 can be prevented while setting the standby position of automatic tool changer 31 to be in the vicinity of cutting-tool-rest-side tool change position K.

The structures of magazine 10 and machine tool 100 according to the embodiment of the present invention as described above are summarized as follows: a magazine 10 according to the present embodiment includes: a transporting device 110 that has tool pots 112 serving as a plurality of tool holding units and that transports the plurality of tool pots 112, each of the plurality of tool pots 112 detachably holding a tool inserted along a center axis 106 serving as a predetermined axis; a reading device 121 that reads an identifier 116 accompanied with a tool in a tool pot 112 transported to a magazine-side tool change position J serving as a predetermined transportation position; a first driving mechanism unit 161 that rotates each of tool pots 112 about center axis 106 so as to position, at a first position Pa, an identifier 116 in a tool pot 112 placed at a transportation position different from magazine-side tool change position J, and so as to position, at a second position Pb, identifier 116 in tool pot 112 placed at magazine-side tool change position J, second position Pb being displaced from first position Pa in a circumferential direction of center axis 106; and a second driving mechanism unit 171 that moves reading device 121 so as to position reading device 121 at a third position Pc when reading identifier 116 by reading device 121 and so as to position reading device 121 at a fourth position Pd when transporting the plurality of tool pots 112 by transporting device 110, third position Pc being a position facing identifier 116 positioned at second position Pb, fourth position Pd being a position away from tool pots 112 with respect to third position Pc.

Further, a machine tool 100 according to the present embodiment includes: magazine 10; and an automatic tool changer 31 that brings tools into and out of magazine 10. Magazine-side tool change position J corresponds to a position at which the tools are changed between magazine 10 and automatic tool changer 31.

It should be noted that the predetermined transportation position in the present invention may be a transportation position of tool pot 112 other than magazine-side tool change position J. In this case, identifier 116 is read by reading device 121 at a position different from the tool change position between magazine 10 and automatic tool changer 31.

Further, the present invention is not limited to the magazine that stores tools to be attached to the cutting tool rest, and can also be applied to a magazine that stores tools to be attached to a tool spindle of a machining center, a multi-axis machine, or the like.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

INDUSTRIAL APPLICABILITY

The present invention is applied to a magazine of a machine tool.

REFERENCE SIGNS LIST

10: magazine; 11: bed; 12, 13: pillar member; 14: supporting frame; 21: headstock; 31: automatic tool changer; 32: arm unit; 33: grasping portion; 51: cutting tool rest; 52: turret; 56: cutting tool rest base; 57: saddle; 61: tool holder; 61S: first tool holder; 61T: second tool holder; 100: machine tool; 101: rotation center axis; 102, 103, 104: pivot center axis; 105: circumference; 106, 210, 211: center axis; 110: transporting device; 111: supporting plate; 112: tool pot; 113: motor; 116: identifier; 118: shank portion; 121: reading device; 126: cylinder; 127: piston rod; 132: pressing plate; 133: attachment plate; 134: notch portion; 141: unclamping cylinder; 151: bar; 151p: one end; 151q: other end; 152: bar-abutment portion; 153: elastic member; 156: bearing; 157: housing; 158: pot main body portion; 161: first driving mechanism unit; 171: second driving mechanism unit; J: magazine-side tool change position; K: cutting-tool-rest-side tool change position; Pa: first position; Pb: second position; Pc: third position; Pd: fourth position; T, t: tool; W: workpiece processing position.

The invention claimed is:

1. A magazine comprising:
a first tool holding unit and a second tool holding unit;
a transporting device being configured to transport the first tool holding unit and the second tool holding unit that are configured thereon, the first tool holding unit and the second tool holding unit detachably holding a first tool and a second tool respectively, the transporting device including a support plate that is rotatable about a pivot center axis, the first and second tool holding units being disposed on the support plate, the first and second tools being inserted in the first and second tool holding units respectively in a direction which extends parallel to the pivot center axis, the first tool having a first identifier and the second tool having a second identifier;
a reader device being configured to read at least the first identifier after the first tool holding unit has been transported to a predetermined transportation position;
a first driving mechanism unit being configured to rotate the first tool holding unit about the direction which extends parallel to the pivot center axis so as to move the first identifier from a first position to a second position, the first tool holding unit being rotated by the first driving mechanism with respect to the support plate, and the second position being angularly displaced from the first position in a circumferential rotation direction of the first tool holding unit; and
a second driving mechanism unit being configured to move the reader device from a third position to a fourth position, wherein the reader device is configured to read the first identifier when the reader device is at the third position facing the identifier at the second position, and wherein the fourth position is further away from the first tool holding unit than is the third position from the first tool holding unit.

2. The magazine according to claim 1, wherein the first driving mechanism unit has:

an elastic member that applies, to the first tool holding unit, elastic force in a direction in which the first identifier is moved from the second position to the first position, and a cylinder that is provided to advance to and retreat from the first tool holding unit placed at the predetermined transportation position and that applies, to the first tool holding unit, external force in the direction in which the first identifier is moved from the first position to the second position.

3. The magazine according to claim 1, wherein the second driving mechanism unit has a cylinder that moves the reader device between the third position and the fourth position.

4. The magazine according to claim 1, wherein the first driving mechanism unit and the second driving mechanism unit share a cylinder that is provided to advance to and retreat from the first tool holding unit placed at the predetermined transportation position, that applies, to the first tool holding unit, external force in a direction in which the first identifier is moved from the first position to the second position, and that moves the reader device between the third position and the fourth position.

5. The magazine according to claim 1, wherein the first and second tool holding units are arranged on the support plate in a circumferential direction, the first identifier positioned at the first position is oriented in a direction tangential to the direction in which the first and second tool holding units are arranged, and the first identifier positioned at the second position is oriented toward an outer circumferential side of the support plate with respect to the direction tangential to the direction in which the first and second tool holding units are arranged.

6. A machine tool comprising:

the magazine according to claim 1; and an automatic tool changer that brings the first and second tools into and out of the magazine, wherein the predetermined transportation position corresponds to a tool change position at which the first and second tools are changed between the magazine and the automatic tool changer.

7. The machine tool according to claim 6, wherein when changing the first and second tools between the magazine and the automatic tool changer, the first identifier is positioned at the first position.

8. The machine tool according to claim 6, wherein when changing the first and second tools between the magazine and the automatic tool changer, the reader device is positioned at the fourth position.

* * * * *